United States Patent
Fukae et al.

(10) Patent No.: US 9,637,811 B2
(45) Date of Patent: May 2, 2017

(54) IRON-BASED SINTERED SLIDING MEMBER AND PRODUCTION METHOD THEREFOR

(71) Applicant: Hitachi Powdered Metals Co., Ltd., Matsudo-shi, Chiba (JP)

(72) Inventors: Daisuke Fukae, Matsudo (JP); Hideaki Kawata, Matsudo (JP); Hidekazu Tokushima, Kashiwa (JP)

(73) Assignee: HITACHI POWDERED METALS CO., LTD., Matsudo-shi (JP)

( * ) Notice: Subject to any disclaimer, the term of this patent is extended or adjusted under 35 U.S.C. 154(b) by 582 days.

(21) Appl. No.: 13/632,460

(22) Filed: Oct. 1, 2012

(65) Prior Publication Data
US 2013/0084203 A1 Apr. 4, 2013

(30) Foreign Application Priority Data
Sep. 30, 2011 (JP) .................... 2011-218275

(51) Int. Cl.
*B22F 3/12* (2006.01)
*B22F 3/24* (2006.01)
(Continued)

(52) U.S. Cl.
CPC ............ *C22C 33/0221* (2013.01); *B22F 3/11* (2013.01); *B22F 3/24* (2013.01); *C22C 38/04* (2013.01);
(Continued)

(58) Field of Classification Search
CPC ...... C22C 38/16; C22C 33/0221; C22C 38/04
(Continued)

(56) References Cited

U.S. PATENT DOCUMENTS 3,132,021 A * 5/1964 Koehring ............ C22C 33/0221
                                                   419/30
3,918,923 A * 11/1975 Inoue .................... F01C 19/005
                                                   418/178
(Continued)

FOREIGN PATENT DOCUMENTS

CN 101469393 A 1/2009
CN 102179519 A 9/2011
(Continued)

OTHER PUBLICATIONS

Nov. 26, 2014 Office Action issued in German Application No. 10 2012 018 964.8.
(Continued)

*Primary Examiner* — Jessee Roe
*Assistant Examiner* — Jeremy Jones
(74) *Attorney, Agent, or Firm* — Oliff PLC

(57) ABSTRACT

An iron-based sintered sliding member consists of, by mass %, 0.1 to 10% of Cu, 0.2 to 2.0% of C, 0.03 to 0.9% of Mn, 0.52 to 6.54% of S, and the balance of Fe and inevitable impurities. The iron-based sintered sliding member satisfies the following First Formula in which [S %] represents mass % of S and [Mn %] represents mass % of Mn in the overall composition. The iron-based sintered sliding member exhibits a metallic structure in which pores and sulfide particles are dispersed in the matrix that includes a martensite structure at not less than 50% by area ratio in cross section. The sulfide particles are dispersed at 3 to 30 vol. % with respect to the matrix.

[S %]=0.6×[Mn %]+0.5 to 6.0     First Formula

9 Claims, 1 Drawing Sheet

$\vdash\!\!\!\dashv$ 100 μm

(51) Int. Cl.
*C22C 33/02* (2006.01)
*B22F 3/11* (2006.01)
*C22C 38/60* (2006.01)
*F16C 33/12* (2006.01)
*C22C 38/04* (2006.01)
*C22C 38/16* (2006.01)

(52) U.S. Cl.
CPC .............. *C22C 38/16* (2013.01); *C22C 38/60* (2013.01); *F16C 33/121* (2013.01); *F16C 33/128* (2013.01)

(58) Field of Classification Search
USPC .......................................................... 419/11
See application file for complete search history.

(56) References Cited

U.S. PATENT DOCUMENTS

| | | | | |
|---|---|---|---|---|
| 2001/0037842 | A1* | 11/2001 | Hayashi | F01L 3/02 148/332 |
| 2004/0182200 | A1 | 9/2004 | Takiguchi et al. | |
| 2005/0040358 | A1 | 2/2005 | Chikahata et al. | |
| 2006/0063020 | A1 | 3/2006 | Barbezat | |
| 2006/0219054 | A1* | 10/2006 | Kawata | C22C 33/0221 75/230 |
| 2008/0112659 | A1* | 5/2008 | Guerreiro | F16C 9/02 384/294 |
| 2008/0146467 | A1* | 6/2008 | Takayama | B22F 3/1035 508/105 |
| 2012/0177528 | A1* | 7/2012 | Takayama | B22F 3/10 419/38 |

FOREIGN PATENT DOCUMENTS

| | | |
|---|---|---|
| DE | 698 06 997 T2 | 5/2003 |
| EP | 0 872 654 A2 | 10/1998 |
| JP | A-64-015350 | 1/1989 |
| JP | A-11-117940 | 4/1999 |
| JP | 2002332552 A * | 11/2002 |
| JP | A-2002-332552 | 11/2002 |
| JP | A-2006-307331 | 11/2006 |
| JP | A-2009-155696 | 7/2009 |
| JP | A-2009-215630 | 9/2009 |

OTHER PUBLICATIONS

Office Action issued in Korean Application No. 10-2012-0107106 issued Mar. 24, 2014 (with translation).
Combined Search and Examination Report issued in British Patent Application No. 1217157.5 dated Oct. 9, 2012.
Office Action issued in Chinese Patent Application No. 201210367522.6 dated May 13, 2014 (with translation).

* cited by examiner

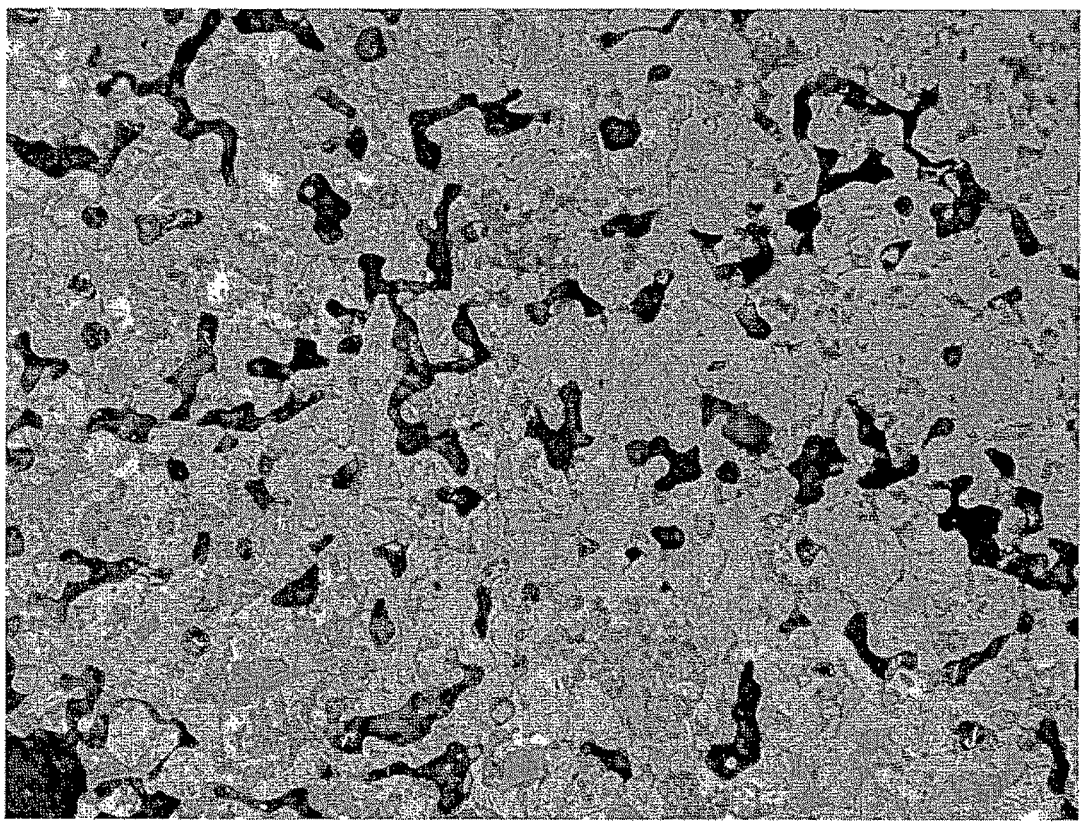

IRON-BASED SINTERED SLIDING MEMBER AND PRODUCTION METHOD THEREFOR

BACKGROUND OF THE INVENTION

Technical Field

The present invention relates to an iron-based sintered sliding member and to a production method therefor, in which a powder metallurgical method is used. In particular, the present invention relates to an iron-based sintered sliding member, which exhibits superior wear resistance and sliding characteristics under high surface pressures, and the present invention relates to a production method therefor.

Background Art

For example, in sliding members having sliding surfaces to be applied with high surface pressure, such as driving portions and sliding portions of vehicles, machine tools, or industrial machines, etc., a carbon steel which was cut and was quench hardened and tempered, or a sintered alloy, is used. Specifically, since the sintered alloys can have self-lubricating characteristics by infiltrating lubricating oil thereinto, they can have superior seizure resistance and wear resistance and are thereby widely used. As a sliding member made of such a sintered alloy, for example, a bearing is disclosed in Japanese Patent Application of Laid-open No. 11-117940. The bearing has a sliding surface provided with an iron-based sintered alloy layer consisting of 10 to 30 weight % of Cu and the balance of Fe.

In addition, an iron-based sintered alloy for a sliding member is disclosed in Japanese Patent Application of Laid-open No. 2009-155696. The iron-based sintered alloy consists of, by mass %, 0.6 to 1.2% of C, 3.5 to 9.0% of Cu, 0.6 to 2.2% of Mn, 0.4 to 1.3% of S, and the balance of Fe and inevitable impurities. The iron-based sintered alloy has a structure in which 1.0 to 3.5 mass % of a MnS phase and at least one of a free Cu phase and a free Cu—Fe alloy phase are dispersed in a martensite matrix.

Since the cost of copper metal has been rising in recent years, the technique of using 10 to 30 weight % of Cu as in the case disclosed in Japanese Patent Application of Laid-open No. 11-117940 has relatively high cost in production and is not practical. In addition, Cu has a low melting point and thereby generates a liquid phase in sintering. Therefore, when the amount of Cu is great, dimensional change of a material for a sliding member before and after the sintering is large. In this case, machining is required in order to satisfy a necessary accuracy, which also increases the production cost.

When Cu is added in a sintered alloy, a soft Cu phase or a soft Cu alloy phase is dispersed in a matrix. Therefore, the degree of wear characteristics with respect to a mating member is decreased, and adaptability to the mating member is improved because the sintered alloy is adequately deformable. Conversely, if the amount of Cu is small, the wear resistance is decreased, and the degree of wear characteristics with respect to a mating member is increased. Moreover, in this case, squeal noises occur if the lubricating oil is insufficient.

In view of this, in the invention disclosed in Japanese Patent Application of Laid-open No. 2009-155696, 1.0 to 3.5 mass % of the MnS phase is dispersed. Thus, the decrease of the wear resistance and the increase of the wear characteristics with respect to a mating member due to decrease in the amount of Cu are avoided. However, the MnS phase is generated by adding a MnS powder to a raw powder, whereby it has low fixability with respect to the matrix and may be exfoliated during sliding.

SUMMARY OF THE INVENTION

In view of these circumstances, an object of the present invention is to provide an iron-based sintered sliding member and a production method therefor. In the iron-based sintered sliding member, the amount of Cu is decreased so as to decrease the production cost, and sulfides having high fixability with respect to a matrix are dispersed.

The present invention provides an iron-based sintered sliding member consisting of, by mass %, 0.1 to 10% of Cu, 0.2 to 2.0% of C, 0.03 to 0.9% of Mn, 0.52 to 6.54% of S, and the balance of Fe and inevitable impurities. The iron-based sintered sliding member satisfies the following First Formula in which [S %] represents mass % of S and [Mn %] represents mass % of Mn in the overall composition. The iron-based sintered sliding member exhibits a metallic structure in which pores and sulfide particles are dispersed in a matrix that contains a martensite structure at not less than 50% by area ratio in cross section. The sulfide particles are dispersed at 3 to 30 vol. % with respect to the matrix.

$$[S\%] = 0.6 \times [Mn\%] + 0.5 \text{ to } 6.0 \qquad \text{First Formula}$$

The present invention also provides a production method for an iron-based sintered sliding member, and the method includes preparing an iron powder, a copper powder, a graphite powder, and at least one sulfide powder of an iron sulfide powder and a copper sulfide powder. The iron powder consists of 0.03 to 1.0 mass % of Mn and the balance of Fe and inevitable impurities. The method also includes forming a raw powder by mixing the copper powder, the graphite powder, and the sulfide powder with the iron powder so as to consist of, by mass %, 0.1 to 10% of Cu, 0.2 to 2.0% of C, 0.03 to 0.9% of Mn, 0.52 to 6.54% of S, and the balance of Fe and inevitable impurities. The method further includes compacting the raw powder into a green compact with a predetermined shape, sintering the green compact at a temperature of 1000 to 1200° C., and quench hardening and tempering the sintered compact.

The grounds of limiting the numerical values in the iron-based sintered sliding member and the production method therefor of the present invention will be described in conjunction with the effects of the present invention hereinafter. The iron-based sintered sliding member of the present invention contains Fe as a primary component. The metallic structure consists of pores and an iron-based matrix (iron alloy matrix) in which sulfide particles are dispersed. The iron-based matrix is formed of at least one of the iron powder and an iron alloy powder. The pores are generated due to the powder metallurgical method and are formed such that spaces are formed among the raw powder particles when the raw powder is compacted, and the spaces remain as pores in the iron-based matrix that is formed by bonding the raw powder particles.

In general, an iron powder contains approximately 0.03 to 1.0 mass % of Mn as an inevitable impurity due to a production method. Naturally, the iron-based matrix contains a small amount of Mn as an inevitable impurity. Therefore, by adding S, sulfide particles such as manganese sulfides and the like are precipitated in the matrix as a solid lubricant. The manganese sulfides finely precipitate and improve machinability, but they are too small to greatly improve the sliding characteristics. In view of this, in the present invention, not only the amount of S for the reaction with the small amount of Mn contained in the matrix, but also an additional amount of S is added so as to form iron sulfides by combining the further added S with Fe of the primary component.

Generally, an element having a larger difference in electronegativity from S forms sulfides more easily. According to the values of the electronegativity proposed by Pauling, S is 2.58, Mn is 1.55, Cr is 1.66, Fe is 1.83, Cu is 1.90, Ni is 1.91, and Mo is 2.16, whereby sulfides are formed by Mn, Cr, Fe, Cu, Ni, or Mo, in this preferential order. Therefore, when S is added at a greater amount than the amount of S that combines with the entire amount of Mn contained in the iron powder and that generates MnS, S reacts with the small amount of Mn and also reacts with Fe of the primary component. As a result, not only the manganese sulfides, but also iron sulfides are precipitated. Accordingly, the sulfides precipitated in the matrix are primarily composed of the iron sulfides, which are made of Fe of the primary component, and a part of the amount of the sulfides is the manganese sulfides, which are made of Mn of the inevitable impurity.

The iron sulfides are sulfide particles with sizes that are suitable for improving the sliding characteristics as a solid lubricant. The iron sulfides are formed by combining S with Fe of the primary component in the matrix and are thereby uniformly dispersed in the matrix. In the present invention, in order to generate sulfides primarily composed of the iron sulfides, Cr is not used for strengthening the iron-based matrix because the value of the electronegativity of Cr is greater than that of Fe.

As described above, in the present invention, S is added at an amount for combining with Mn contained in the matrix, and S is further added so as to precipitate the sulfides by combining with Fe of the primary component in the matrix. If the amount of the sulfide particles dispersed in the matrix is less than 3 vol. %, the lubricating effect is not sufficiently obtained, and the sliding characteristics are decreased. On the other hand, if the amount of the sulfide particles is greater than 30 vol. %, the amount of the sulfides is excessive with respect to the matrix, whereby the strength of the iron-based sintered sliding member is decreased. Accordingly, the amount of the sulfide particles in the matrix is set to be 3 to 30 vol. % with respect to the matrix.

In order to obtain this amount of the sulfides, it is necessary to set the amount of S in the overall composition so as to satisfy the following Second Formula, in which [S %] represents mass % of S and [Mn %] represents mass % of Mn in the overall composition. In the Second Formula, the first term in the right side "0.6×[Mn %]" represents the amount of S which is necessary for forming the manganese sulfides by combining with the small amount of Mn contained as an inevitable impurity. The second term in the right side "0.5 to 0.6" represents the additional amount of S (mass %). If the additional amount of S is less than 0.5 mass %, the predetermined amount of the sulfide particles is not obtained. In contrast, if the additional amount of S is greater than 6.0 mass %, the sulfide particles are excessively precipitated.

[S %]=0.6×[Mn %]+0.5 to 6.0    Second Formula

The manganese sulfides finely precipitate in the iron-based matrix and improve the machinability, but they do not greatly improve the sliding characteristics. When the amount of Mn in the overall composition is large, a greater amount of S is required as recited in the Second Formula. Since S reacts with Fe and generates a eutectic phase, if the amount of S is excessive, the green compact loses its shape during sintering. Accordingly, the amount of Mn is preferably smaller in view of the sliding characteristics and the sintering characteristics. Specifically, the amount of Mn is set to be not more than 0.9 mass %. For example, a highly compressible iron powder is commercially available. In this iron powder, the amount of Mn is decreased to not more than 0.1 mass % so as to improve the compressibility of the iron powder. Such an iron powder is more preferably used because the value of [Mn %] can be decreased to not more than 0.1.

S may be added in the form of a metallic sulfide powder such as an iron sulfide powder, a copper sulfide powder, a nickel sulfide powder, a molybdenum disulfide powder, or the like, and at least one kind among these sulfide powders is used. When S is added in the form of the metallic sulfide powder or the like, to the raw powder, the metallic sulfide powder is decomposed in the sintering, thereby providing atoms of S. The atom of S combines with Fe surrounding the metallic sulfide powder particles and generates FeS. FeS added in the form of the iron sulfide powder and FeS generated by the decomposition of the metallic sulfides react with Fe of the primary component and generate eutectic liquid phases. Therefore, liquid-phase sintering occurs, and neck growth between powder particles is accelerated. In addition, S uniformly diffuses from the eutectic liquid phase to the iron-based matrix, whereby sulfide particles are uniformly precipitated from the matrix.

According to the decomposition of the metallic sulfide powders, atoms of Cu, Ni, or Mo, etc. are generated. These elements are difficult to form metallic sulfides compared with Fe as is clear from the values of the electronegativity. Therefore, these elements are mostly diffused and are solid-solved in the iron-based matrix, thereby strengthening the iron-based matrix. There are cases in which part of the amounts of these elements precipitate as metallic sulfides of Cu, Ni, or Mo, etc., but the amounts of these metallic sulfides are sufficiently small to not cause problems.

Thus, since the sulfides such as the manganese sulfides, the iron sulfides, or the like, are precipitated by combining S with Mn and Fe in the matrix, they are precipitated from the matrix and are uniformly dispersed. Therefore, the sulfides are firmly fixed to the matrix and are not easily exfoliated during sliding. Accordingly, superior sliding characteristics are obtained for a long period of time. In addition, since the sulfides are generated by the precipitation from the iron-based matrix, they do no prevent diffusion among the raw powder particles in the sintering.

As described above, since the liquid-phase sintering occurs and the diffusion among the raw powder particles is smoothly performed, the strength of the iron-based matrix is improved, and the wear resistance of the iron-based matrix is increased. In the iron-based sintered sliding member of the present invention, the solid lubricant is dispersed in the pores and grain boundaries of the powder particles and is also uniformly dispersed in the matrix by firmly fixing to the matrix. Accordingly, the sliding characteristics and the strength of the matrix are improved, and the wear resistance is increased.

In order to obtain the solid lubricating effect in sliding with a mating member, the sulfides precipitated in the matrix preferably have predetermined sizes rather than small sizes. In this regard, the amount of sulfide particles with maximum particle sizes of not less than 10 μm is preferably not less than 60% in the total amount of the sulfide particles. If the maximum particle sizes of the sulfide particles are smaller than 10 μm, the solid lubricating effect is difficult to obtain sufficiently. In addition, if the amount of the sulfide particles with the maximum particle sizes of not less than 10 μm is less than 60% in the total amount of the sulfide particles, the solid lubricating effect is difficult to obtain sufficiently.

The matrix, in which the sulfides are dispersed, is made so as to contain a martensite structure at not less than 50% by area ratio in cross section. The martensite structure is hard and has high strength. Therefore, by forming not less than 50% of the matrix structure so as to be such a martensite structure, plastic deformation of the matrix is prevented and superior sliding characteristics are obtained even in a sliding condition in which high surface pressure is applied. It is preferable that the entirety of the matrix structure be made of martensite. Otherwise, by forming the matrix structure so as to contain martensite at not less than 50% by area ratio in cross section, superior sliding characteristics are obtained in a sliding condition in which a high surface pressure of, for example, not less than 20 MPa is applied. The rest of the matrix is a metallic structure of sorbite, troostite, bainite, or the like.

In the iron-based sintered sliding member of the present invention, in order to strengthen the iron-based matrix, Cu and C are solid solved in the iron matrix, and the iron-based matrix is used in the form of an iron alloy. The effects of Cu and C will be described hereinafter.

By solid solving Cu into the iron-based matrix, the iron-based matrix is strengthened. In order to sufficiently strengthen the matrix, not less than 0.1 mass % of Cu is required. When the amount of Cu is 3.5 mass % or more, supersaturated Cu is precipitated in the matrix as a soft Cu phase, whereby the wear characteristics with respect to a mating member is decreased. In addition, Cu precipitated in the iron-based matrix generates an interface between Cu and the surrounding Fe, and the interface functions as a starting point for precipitation of the sulfides. Therefore, by adding Cu, the sulfides are more easily precipitated in the matrix, and they are firmly fixed and are dispersed in the matrix instead of existing in the pores. On the other hand, if the amount of Cu is excessive, a great amount of the Cu phase with low strength is dispersed, whereby the strength of the iron-based sintered sliding member is decreased. Moreover, in this case, the liquid phase is excessively generated in the sintering, whereby the iron-based sintered sliding member is greatly changed in shape. Accordingly, the upper limit of the amount of Cu is set to be 10 mass %.

If Cu is added in the form of an iron alloy powder by solid solving Cu in Fe, the raw powder is hardened, and the compressibility of the raw powder is decreased. Therefore, Cu is added in the form of a copper powder or a copper sulfide powder. The copper powder and the copper sulfide powder generate a Cu liquid phase in the sintering and wet and cover the iron powder particles, thereby being dispersed in the iron powder particles. In addition, Cu rapidly diffuses into the iron-based matrix. Accordingly, even when Cu is added in the form of the copper powder or the copper sulfide powder, Cu is approximately uniformly diffused in the iron-based matrix.

If copper phases are dispersed in the matrix structure, there are cases in which a part of the amount of the copper phases forms copper sulfides. When such copper sulfides are dispersed in the matrix, the amount of the iron sulfides is decreased with an increase in the amount of the copper sulfides. However, the copper sulfides also act as solid lubricant. Therefore, such copper sulfides dispersed in the matrix are allowable.

C is used for strengthening the iron-based matrix by solid solving C therein and is also used for forming a martensite structure in the matrix structure. If the amount of C is insufficient, ferrite with low strength is dispersed in the matrix structure, whereby strength and wear resistance are decreased. Therefore, the amount of C is set to be not less than 0.2 mass %. On the other hand, if the amount of C is excessive, brittle cementite with a netlike appearance is precipitated. Therefore, the upper limit of the amount of C is set to be 2.0 mass %. If C is added in the form of an iron alloy powder by solid solving C in Fe, the raw power is hardened, and the compressibility is decreased. Accordingly, C is added in the form of a graphite powder.

In the iron-based sintered sliding member of the present invention, an alloying element such as Ni, Mo, or the like, may be further added in order to strengthen the matrix. According to the relationship of the electronegativity as described above, even when Ni, Mo, or the like is added, sulfides of Mn and Fe are preferentially precipitated. That is, sulfides precipitated in the matrix are primarily composed of iron sulfides and include a small amount of manganese sulfides, and sulfides of Ni, Mo, or the like are precipitated in very small amounts. Accordingly, these elements can be used for strengthening the iron-based matrix.

Ni and Mo are solid solved in the iron-based matrix and thereby strengthen the iron-based matrix, and they improve hardenability of the iron-based matrix and thereby facilitate martensitic transformation. If the amount of Ni is excessive, an austenite phase with low strength may remain in the matrix. Since the cost of Mo is high, the cost of the raw material is increased according to the increase in the amount of Mo. Accordingly, the upper limit of the amount of Ni or Mo is set to be 10 mass %.

Even when each of Ni and Mo is added in the form of an iron alloy powder by solid solving Ni or Mo in Fe, the hardness of the iron alloy powder is not greatly increased. Therefore, each of Ni and Mo can be added in the form of the iron alloy powder. Alternatively, Ni and Mo may be added to the raw powder in the form of a nickel powder and a molybdenum powder, respectively. Otherwise, Ni and Mo may be added to the raw powder in the form of a nickel sulfide powder and a molybdenum disulfide powder, respectively. The nickel sulfide powder and the molybdenum disulfide powder may be added to the raw powder in addition to the iron sulfide powder or the copper sulfide powder, or instead of a part of an amount or the entirety of the iron sulfide powder or the copper sulfide powder.

As described above, the raw powder for the iron-based sintered sliding member of the present invention consists essentially of (1) an iron powder, (2) a copper powder, (3) a graphite powder, and (4) at least one sulfide powder of an iron sulfide powder and a copper sulfide powder. The iron powder consists of 0.03 to 1.0 mass % of Mn and the balance of Fe and inevitable impurities. The raw powder is obtained by mixing the powders (1) to (4) so as to consist of, by mass %, 0.1 to 10% of Cu, 0.2 to 2.0% of C, 0.03 to 0.9% of Mn, 0.52 to 6.54% of S, and the balance of Fe and inevitable impurities.

The raw powder is compacted as is conventionally done. That is, the raw powder is compacted into a green compact by a so-called "die pressing method". In this method, a die assembly including a die, a lower punch, a core rod, and an upper punch is used. The die has a hole for forming an outer circumferential shape of a product. The lower punch is slidably fitted into the hole of the die and forms a lower end surface of the product. The core rod forms an inner circumferential shape or a recess portion of the product as necessary. The die, the lower punch, and the core rod form a cavity. The upper punch forms an upper end surface of the product. The raw powder is filled into the cavity and is compacted into a green compact by the upper punch and the lower punch. Then, the green compact is pulled out from the hole of the die.

The green compact is sintered in a sintering furnace at a temperature in a range of 1000 to 1200° C. The heating temperature, that is, the sintering temperature greatly affects reaction rate of sintering and diffusion of elements. If the sintering temperature is less than 1000° C., the Cu liquid phase is insufficiently generated, whereby a predetermined metallic structure is difficult to obtain. In contrast, if the sintering temperature is greater than 1200° C., the liquid phase is excessively generated, whereby the sintered compact easily loses its shape. Therefore, the sintering temperature is set to be at a temperature in the range of 1000 to 1200° C.

The sintered compact is quench hardened so that not less than 50% of the matrix structure is made of a martensite structure. The quench hardening treatment is performed by heating the sintered compact to be not less than the austenite transformation temperature and then by rapidly cooling in oil or water, as is conventionally done. It is appropriate that the heating temperature be 820 to 1000° C. in the quench hardening treatment. The quench hardening treatment is performed in a nonoxidizing atmosphere or may be performed in a carburizing atmosphere.

The sintered compact after the quench hardening treatment has a hard and brittle metallic structure because strain is excessively accumulated by the quench hardening treatment. Therefore, a tempering treatment is performed on the sintered compact after the quench hardening treatment, as is conventionally done. The tempering treatment is performed by reheating the sintered compact to a temperature in a range of 150 to 280° C. and then by cooling the sintered compact to room temperature. By performing such tempering treatment, internal stress is decreased, and strain generated by the quench hardening treatment is removed without decreasing the hardness of the sintered compact. If the heating temperature in the tempering is less than 150° C., the strain is not sufficiently removed. On the other hand, if the heating temperature is greater than 280° C., the low carbon martensite tends to be decomposed into ferrite and cementite, and the hardness is decreased.

According to the iron-based sintered sliding member of the present invention, the amount of Cu is small, and the sulfides which function as a solid lubricant are precipitated in the matrix. The sulfides are firmly fixed to the matrix, whereby superior sliding characteristics are obtained for a long period of time. Moreover, not less than 50% of the matrix structure is made of a martensite structure, whereby superior sliding characteristics are obtained even in a sliding condition in which high surface pressure is applied.

According to the present invention, an iron-based sintered sliding member and a production method therefor are obtained. In the iron-based sintered sliding member, the amount of Cu is decreased so as to decrease the production cost, and sulfides are dispersed and are firmly fixed to the matrix.

BRIEF DESCRIPTION OF THE DRAWING

FIG. 1 is a photograph example of a metallic structure of an iron-based sintered sliding member of the present invention.

PREFERRED EMBODIMENTS OF THE INVENTION

The iron-based sintered sliding member and the production method therefor of the present invention will be described in detail hereinafter. It should be noted that the following preferred embodiments are examples, and the present invention is not limited thereto.

(1) First Embodiment

An iron powder, a copper powder, a graphite powder, and at least one kind of an iron sulfide powder and a copper sulfide powder, are prepared. The iron powder consists of 0.03 to 1.0 mass % of Mn and the balance of Fe and inevitable impurities. The copper powder, the graphite powder, at least one kind of the iron sulfide powder and the copper sulfide powder at the amount for satisfying the First Formula, are mixed with the iron powder, whereby a raw powder is formed. In this case, the amount of each powder is adjusted so that the raw powder consists of, by mass %, 0.1 to 10% of Cu, 0.2 to 2.0% of C, 0.03 to 0.9% of Mn, 0.52 to 6.54% of S, and the balance of Fe and inevitable impurities. The raw powder is compacted into a green compact with a predetermined shape. The green compact is sintered at a temperature in the range of 1000 to 1200° C. Next, the sintered compact is quench hardened by heating to a temperature of 820 to 1000° C. in a nonoxidizing atmosphere and then by rapidly cooling in oil or water. Then, the sintered compact is tempered by heating to a temperature in the range of 150 to 280° C. and cooling to room temperature. Thus, an iron-based sintered sliding member having the above-described composition and having a metallic structure in which pores and sulfide particles are dispersed in a matrix is obtained. The matrix includes a martensite structure at not less than 50% by area ratio in a cross section. The sulfide particles are dispersed at 3 to 30 vol. % with respect to the matrix.

In this iron-based sintered sliding member, not less than 50% of the matrix is made of martensite, and a large amount of iron sulfides, and small amounts of manganese sulfides and copper sulfides, are dispersed in the matrix. Therefore, the iron-based sintered sliding member has superior sliding characteristics. In particular, when the amount of Cu is not less than 3.5 mass % in the raw powder, a greater amount of the copper phase is dispersed in the matrix, whereby the wear characteristics with respect to a mating member are further decreased. Since liquid-phase sintering occurs, and diffusion among the raw powder particles is smoothly performed, the strength of the iron-based matrix is improved, and the wear resistance of the iron-based matrix is improved. The solid lubricant is uniformly dispersed in the matrix in addition to the pores and the powder grain boundaries and is firmly fixed to the matrix. Accordingly, the sliding characteristics and the strength of the matrix are improved, and the wear resistance is improved.

(2) Second Embodiment

In order to improve strength of the matrix, at least one metallic sulfide powder of a nickel sulfide powder and a molybdenum disulfide powder is added to the raw powder so as to satisfy the First Formula in the First Embodiment. The nickel sulfide powder and the molybdenum disulfide powder are used instead of the entirety or a part of the amount of the iron sulfide powder and the copper sulfide powder. The amount of each of the nickel sulfide powder and the molybdenum disulfide powder is set so that each of Ni and Mo is not more than 10 mass % in the overall composition of the raw powder. Then, compacting, sintering, and a heat treatment (quench hardening and tempering) are performed as in the case of the First Embodiment, whereby an iron-based sintered sliding member is produced.

In this case, the iron-based sintered sliding member has an overall composition in which at least one alloy element of Ni and Mo is added at not more than 10 mass % to the overall composition in the First Embodiment. The nickel sulfide powder and the molybdenum disulfide powder are decomposed in the sintering and generate Ni and Mo, respectively. These alloy elements are solid solved in the iron-based matrix, whereby the strength of the iron-based matrix is improved. Part of the amounts of Ni and Mo form sulfides. Therefore, the iron-based sintered sliding member has a metallic structure in which a large amount of iron sulfides and small amounts of manganese sulfides, copper sulfides, sulfides of at least one of Ni and Mo, are dispersed in a matrix that contains martensite at not less than 50%.

(3) Third Embodiment

In order to improve strength of the matrix, Mo is further added to the raw powder in the First Embodiment. Mo is used in the form of an iron alloy powder by adding Mo to the iron powder. Alternatively, Mo may be used in the form of a molybdenum powder in addition to, or instead of the iron alloy powder. The amount of the powder containing Mo is adjusted so that Mo is not more than 10 mass % in the overall composition of the raw powder. Then, compacting, sintering, and a heat treatment (quench hardening and tempering) are performed as in the case of the First Embodiment. Thus, an iron-based sintered sliding member in which Mo is further added at not more than 10 mass % in the overall composition in the First Embodiment is obtained. This iron-based sintered sliding member has a metallic structure similar to that in the Second Embodiment. In the metallic structure, a large amount of iron sulfides, and small amounts of metallic sulfides such as manganese sulfides, copper sulfides, molybdenum sulfides, and the like, are dispersed. Since Mo is added, the strength of the iron-based matrix is improved, and the area ratio of the martensite structure is increased because the martensite structure is more easily obtained, compared with the case of the First Embodiment.

(4) Fourth Embodiment

Whereas Mo is used in the Third Embodiment, Ni may be used in order to improve strength of the matrix. Ni is used in the form of an iron alloy powder by adding Ni to the iron powder. Alternatively, Ni may be used in the form of a nickel powder in addition to, or instead of the iron alloy powder. The amount of the powder containing Ni is adjusted so that Ni is not more than 10 mass % in the overall composition of the raw powder. Then, compacting, sintering, and heat treatment (quench hardening and tempering) are performed as in the case of the First Embodiment. Thus, an iron-based sintered sliding member in which Ni is further added at not more than 10 mass % in the overall composition in the First Embodiment is obtained. The iron-based sintered sliding member has a metallic structure in which a large amount of iron sulfides, and small amounts of metallic sulfides such as manganese sulfides, copper sulfides, nickel sulfides, and the like, are dispersed. Since Ni is added, the strength of the iron-based matrix is improved, and the area ratio of the martensite structure is increased because the martensite structure is more easily obtained, compared to the case of the First Embodiment.

EXAMPLES

The iron-based sintered sliding member of the present invention will be described in further detail by way of examples hereinafter.

First Example

An iron powder containing 0.3 mass % of Mn, an iron sulfide powder containing 36.48 mass % of S, a copper powder, and a graphite powder, were prepared. The iron sulfide powder in the amounts shown in Table 1, 1.5 mass % of the copper powder, and 1.0 mass % of the graphite powder, were mixed with the iron powder, whereby a raw powder was obtained. The raw powder was compacted at a compacting pressure of 600 MPa, and a larger green compact and a smaller green compact were formed. The larger green compact had a ring shape with an outer diameter of 25.6 mm, an inner diameter of 20 mm, and a height of 15 mm. The smaller green compact had a ring shape with an outer diameter of 18 mm, an inner diameter of 10 mm, and a height of 10 mm. Next, these green compacts were sintered at 1150° C. in a nonoxidizing gas atmosphere, and they were maintained at 850° C. in a carburizing gas atmosphere and were oil quenched. Then, these sintered compacts were tempered at 180° C., whereby samples of sintered members of samples Nos. 01 to 14 were formed. The overall compositions of these samples are also shown in Table 1. In addition, the value of "0.6×[Mn %]" which represents the amount of S combining with Mn, and the value of "[S %]−0.6×[Mn %]" which represents the amount of S combining with elements other than Mn, are also shown in Table 1. In this case, the symbol [Mn %] represents the amount of Mn, and the symbol [S %] represents the amount of S, in the overall composition, respectively.

In each of these samples, a cross sectional structure was observed, and an area of sulfides was measured by using image analyzing software ("WinROOF" produced by Mitani Corporation). Moreover, an area of sulfides with maximum particle sizes of not less than 10 μm was measured, and the ratio of this area to the area of the overall sulfides was calculated. Similarly, a ratio of an area of martensite was measured. These results are shown in Table 2.

The sintered member formed of the larger green compact was subjected to a sliding test by using a ring on disc frictional wear testing machine, and a frictional coefficient was measured. In the sliding test, a heat treated steel of SCM435H specified by Japanese Industrial Standards (JIS) was used as a mating material. The sliding test was performed at a circumferential speed of 400 rpm by applying a load of 20 MPa. As lubricating oil, an engine oil equivalent to 10W-30 was used. This result is also shown in Table 2.

Moreover, the sintered member formed of the smaller green compact was tested by using an "AUTOGRAPH" manufactured by Shimadzu Corporation, and compressive strength was measured. This result is also shown in Table 2.

TABLE 1

| | Mixing ratio mass % | | | | Sintering temperature | Overall composition mass % | | | | | [Mn %] × 0.6 | [S %] − [Mn %] × 0.6 |
|---|---|---|---|---|---|---|---|---|---|---|---|---|
| No. | Iron powder | Iron sulfide powder | Copper powder | Graphite powder | ° C. | Fe | Cu | C | Mn | S | | |
| 01 | Bal. | 0.75 | 1.5 | 1.0 | 1150 | Bal. | 1.5 | 1.0 | 0.29 | 0.27 | 0.2 | 0.1 |
| 02 | Bal. | 1.02 | 1.5 | 1.0 | 1150 | Bal. | 1.5 | 1.0 | 0.29 | 0.37 | 0.2 | 0.2 |
| 03 | Bal. | 1.30 | 1.5 | 1.0 | 1150 | Bal. | 1.5 | 1.0 | 0.29 | 0.47 | 0.2 | 0.3 |
| 04 | Bal. | 1.57 | 1.5 | 1.0 | 1150 | Bal. | 1.5 | 1.0 | 0.29 | 0.57 | 0.2 | 0.4 |
| 05 | Bal. | 1.84 | 1.5 | 1.0 | 1150 | Bal. | 1.5 | 1.0 | 0.29 | 0.67 | 0.2 | 0.5 |
| 06 | Bal. | 3.21 | 1.5 | 1.0 | 1150 | Bal. | 1.5 | 1.0 | 0.28 | 1.17 | 0.2 | 1.0 |
| 07 | Bal. | 4.57 | 1.5 | 1.0 | 1150 | Bal. | 1.5 | 1.0 | 0.28 | 1.67 | 0.2 | 1.5 |
| 08 | Bal. | 5.94 | 1.5 | 1.0 | 1150 | Bal. | 1.5 | 1.0 | 0.27 | 2.16 | 0.2 | 2.0 |
| 09 | Bal. | 8.66 | 1.5 | 1.0 | 1150 | Bal. | 1.5 | 1.0 | 0.27 | 3.16 | 0.2 | 3.0 |
| 10 | Bal. | 11.39 | 1.5 | 1.0 | 1150 | Bal. | 1.5 | 1.0 | 0.26 | 4.15 | 0.2 | 4.0 |
| 11 | Bal. | 14.12 | 1.5 | 1.0 | 1150 | Bal. | 1.5 | 1.0 | 0.25 | 5.15 | 0.2 | 5.0 |
| 12 | Bal. | 16.85 | 1.5 | 1.0 | 1150 | Bal. | 1.5 | 1.0 | 0.24 | 6.15 | 0.1 | 6.0 |
| 13 | Bal. | 22.30 | 1.5 | 1.0 | 1150 | Bal. | 1.5 | 1.0 | 0.23 | 8.14 | 0.1 | 8.0 |

TABLE 2

| No. | Amount of sulfides area % | Ratio of sulfides with sizes of not less than 10 μm % | Amount of martensite phase area % | Frictional coefficient | Compressive strength MPa |
|---|---|---|---|---|---|
| 01 | 1.2 | 0 | 93 | 0.26 | 720 |
| 02 | 1 | 2 | 92 | 0.24 | 720 |
| 03 | 2 | 10 | 90 | 0.22 | 710 |
| 04 | 2 | 40 | 90 | 0.20 | 710 |
| 05 | 3 | 60 | 90 | 0.14 | 700 |
| 06 | 5 | 67 | 88 | 0.12 | 690 |
| 07 | 7 | 72 | 84 | 0.11 | 600 |
| 08 | 10 | 85 | 80 | 0.10 | 550 |
| 09 | 15 | 95 | 75 | 0.10 | 480 |
| 10 | 20 | 97 | 70 | 0.10 | 450 |
| 11 | 26 | 99 | 60 | 0.12 | 440 |
| 12 | 30 | 99 | 50 | 0.14 | 420 |
| 13 | 40 | 99 | 40 | 0.20 | 320 |

As shown in Tables 1 and 2, according to the increase of the amount of the iron sulfide powder, the amount of S in the overall composition was increased, and a larger amount of sulfides was precipitated. The sulfides with maximum particle sizes of not less than 10 μm hardly existed when the amount of S was small in the overall composition. According to the increase of the amount of S, the ratio of the sulfides with maximum particle sizes of not less than 10 μm was increased, and most of the sulfides had maximum particle sizes of not less than 10 μm. In addition, according to the increase of the amount of S, the area ratio of the martensite structure was decreased.

In the samples of the samples Nos. 01 to 04, since the amounts of the iron sulfide powder were small, the amounts of S were small. In these samples, the values of "[S %]−0.6×[Mn %]" were less than 0.5, and the amounts of the sulfides were less than 3% by area ratio, whereby the frictional coefficients were large. On the other hand, in the samples of the samples Nos. 05 to 12, the values of "[S %]−0.6×[Mn %]" were 0.5 or higher, whereby the amounts of the sulfides were not less than 3% by area ratio, and the ratios of the sulfides with maximum particle sizes of not less than 10 μm were not less than 60%. In addition, the ratios of the martensite structure were not less than 50%. In these samples, sulfides with sizes that are large enough to function as a solid lubricant were sufficiently precipitated. Therefore, the frictional coefficients were decreased by not less than 40% with respect to that of the sample of the sample No. 01. The frictional coefficient was decreased with the increase of the precipitated amount of the sulfides.

In the sample of the sample No. 13, the amount of the sulfides was greater than 30%, and the sulfides were coarsened. This was because according to the increase of the amount of S, the sulfides were excessively precipitated, and plural sulfide particles grew at the same site and became a composite particle. Since the sulfides were large, distances between the sulfide particles were extended, and area of the matrix without the sulfides was increased. Therefore, the frictional coefficient was slightly increased. According to the increase of the amount of the iron sulfide powder, generation of the liquid phase was increased. As a result, in the sample of the sample No. 13 in which the value of "[S %]−0.6×[Mn %]" was greater than 6.0, the liquid phase was excessively generated, whereby the sample lost its shape.

On the other hand, the compressive strength was decreased with the increase of the amount of the iron sulfide powder. According to the increase of the amount of the iron sulfide powder, since S is a ferrite-stabilizing element, the sample became difficult to be austenitized even by the heat treatment at the same temperature, whereby the ratio of martensite was decreased. In addition, the metallic sulfides were increased at the same time, which also decreased the ratio of martensite. Therefore, the compressive strength was decreased. In particular, in the sample of the sample No. 13, the liquid phase was substantially generated, whereby the compressive strength was greatly decreased.

Accordingly, it is necessary to set the value of "[S %]−0.6×[Mn %]" to be 0.5 to 6.0. Thus, the sizes and the amount of the sulfides dispersed in the matrix are appropriately adjusted. In this case, the sulfide particles are obtained at 3 to 30% by area ratio, and the sulfides with maximum particle sizes of not less than 10 μm are obtained at a ratio of not less than 60%. In addition, the martensite phase is obtained at not less than 50% by area ratio. By controlling the sizes and the amount of the sulfides as described above, an iron-based sintered sliding member having superior sliding characteristics, high wear resistance, and high compressive strength, is obtained.

A metallic structure of the iron-based sintered sliding member of the sample No. 09 is shown in FIG. 1 as an example. As shown in FIG. 1, the matrix is made primarily of a martensite structure, and a small amount of pearlite (black structure in FIG. 1) is observed. The martensite matrix increases the hardness of the material and increases the compressive strength. On the other hand, sulfide particles (gray portions in FIG. 1) are dispersed in the matrix, and they are precipitated from the matrix. Since the sulfide particles had predetermined sizes as shown in FIG. 1, they functioned as a solid lubricant and decreased the frictional coefficient. The metallic structure includes pores (black portions in FIG. 1) that have relatively round shapes due to generation of FeS liquid phase.

Second Example

An iron powder containing Mn at the ratio shown in Table 3, an iron sulfide powder containing 36.48 mass % of S, a copper powder, and a graphite powder, were prepared. The iron sulfide powder was added to the iron powder so that the value of "[S %]−0.6×[Mn %]" would be 2.0. Moreover, 1.5 mass % of the copper powder and 1.0 mass % of the graphite powder were also mixed with the iron powder, whereby a raw powder was obtained. Then, the raw powder was compacted, sintered, and heat treated in the same manner as in the First Example, whereby samples of samples Nos. 14 to 20 were formed. As in the case of the First Example, the area of the sulfides, the ratio of the sulfides with maximum particle sizes of not less than 10 μm to the total area of the sulfides, the area ratio of the martensite structure, the frictional coefficient, and the compressive strength, were measured. These results are shown in Table 4. The value of "0.6×[Mn %]" and the value of "[S %]−0.6×[Mn %]" are also shown in Table 3. In addition, the values of the sample of the sample No. 08 in the First Example are also shown in Tables 3 and 4.

increased, the ratio of the sulfides with maximum particle sizes of not less than 10 μm was decreased, and the sulfides were decreased in sizes.

Even when the amount of Mn was increased, until the amount of Mn in the overall composition was not more than 0.9%, a sintered member with low frictional coefficient was obtained by adjusting the amount of S so as to include an appropriate amount of the sulfides with predetermined sizes.

When the amount of Mn was increased, the area ratio of the martensite phase was also increased. However, the compressive strength was decreased. This was because according to the increase of the amount of Mn, the area ratio of the sulfides was increased, and the bonding strength between the metallic particles was decreased. In addition, according to the increase of the amount of Mn in the iron powder, the iron powder was hardened, and the compressibility was decreased, whereby the compressive strength was decreased. In general, Mn is one of elements that improve the hardenability. Nevertheless, since the amount of S was supersaturated with respect to the amount of Mn, Mn for improving the hardenability was hardly obtained, whereby the effect of Mn for improving the strength was not obtained. Therefore, in the sample of the sample No. 20, the compressive strength was greatly decreased. Accordingly, the amount of Mn in the overall composition is set to be 0.03 to 0.9 mass %.

The frictional coefficient and the compressive strength were superior when the amount of S was 0.67 to 6.15 mass % in the overall composition in the First Example. However,

TABLE 3

| | Mixing ratio mass % | | | | Sintering | Overall composition | | | | | [S %] − | |
|---|---|---|---|---|---|---|---|---|---|---|---|---|
| | Iron powder | Iron | | | temperature | mass % | | | | | [Mn %] × | [Mn %] × |
| No. | Mn mass % | sulfide powder | Copper powder | Graphite powder | ° C. | Fe | Cu | C | Mn | S | 0.6 | 0.6 |
| 14 | Bal. 0.03 | 5.53 | 1.5 | 1.0 | 1150 | Bal. | 1.5 | 1.0 | 0.03 | 2.02 | 0.0 | 2.0 |
| 15 | Bal. 0.05 | 5.56 | 1.5 | 1.0 | 1150 | Bal. | 1.5 | 1.0 | 0.05 | 2.03 | 0.0 | 2.0 |
| 16 | Bal. 0.10 | 5.63 | 1.5 | 1.0 | 1150 | Bal. | 1.5 | 1.0 | 0.09 | 2.06 | 0.1 | 2.0 |
| 17 | Bal. 0.20 | 5.78 | 1.5 | 1.0 | 1150 | Bal. | 1.5 | 1.0 | 0.18 | 2.11 | 0.1 | 2.0 |
| 08 | Bal. 0.30 | 5.94 | 1.5 | 1.0 | 1150 | Bal. | 1.5 | 1.0 | 0.27 | 2.16 | 0.2 | 2.0 |
| 18 | Bal. 0.50 | 6.23 | 1.5 | 1.0 | 1150 | Bal. | 1.5 | 1.0 | 0.46 | 2.27 | 0.3 | 2.0 |
| 19 | Bal. 0.96 | 6.91 | 1.5 | 1.0 | 1150 | Bal. | 1.5 | 1.0 | 0.87 | 2.52 | 0.5 | 2.0 |
| 20 | Bal. 1.20 | 7.26 | 1.5 | 1.0 | 1150 | Bal. | 1.5 | 1.0 | 1.08 | 2.65 | 0.6 | 2.0 |

TABLE 4

| No. | Amount of sulfides area % | Ratio of sulfides with sizes of not less than 10 μm % | Amount of martensite phase area % | Frictional coefficient | Compressive strength MPa |
|---|---|---|---|---|---|
| 14 | 9 | 95 | 78 | 0.12 | 570 |
| 15 | 9 | 95 | 78 | 0.12 | 560 |
| 16 | 9 | 90 | 80 | 0.11 | 560 |
| 17 | 10 | 90 | 80 | 0.10 | 550 |
| 08 | 10 | 85 | 80 | 0.10 | 550 |
| 18 | 10 | 80 | 82 | 0.10 | 520 |
| 19 | 11 | 70 | 82 | 0.10 | 480 |
| 20 | 12 | 60 | 84 | 0.10 | 350 |

As shown in Tables 3 and 4, when the amount of Mn in the iron powder was increased, and the amount of Mn in the overall composition was increased, the precipitated amount of the sulfides was increased. According to the increase of the amount of Mn, since fine manganese sulfides were in view of the First Formula and the results of the Second Example, the amount of S can be set so as to be 0.52 to 6.54 mass %.

Third Example

An iron powder containing 0.3 mass % of Mn, an iron sulfide powder containing 36.48 mass % of S, a copper powder, and a graphite powder, were prepared. The iron sulfide powder was added to the iron powder so that the value of "[S %]−0.6×[Mn %]" would be 2.0. Moreover, the copper powder in the amounts shown in Table 5, and 1.0 mass % of the graphite powder, were also mixed with the iron powder, whereby a raw powder was obtained. Then, the raw powder was compacted, sintered, and heat treated in the same manner as in the First Example, whereby samples of samples Nos. 21 to 30 were formed. As in the case of the First Example, the area of the sulfides, the ratio of the sulfides with maximum particle sizes of not less than 10 μm to the total area of the sulfides, the area ratio of the martensite structure, the frictional coefficient, and the compressive strength, were measured. These results are shown in Table 6. The value of "0.6×[Mn %]" and the value of "[S %]−0.6×[Mn %]" are also shown in Table 5. In addition, the values of the sample of the sample No. 08 in the First Example are also shown in Tables 5 and 6.

metallic structure of this sample, a great amount of sulfides was precipitated at interfaces between powder particles, which caused a decrease in strength. On the other hand, in the samples of the samples Nos. 22 to 29, the sulfides were dispersed in the matrix. In these samples, since Cu tends to precipitate separately in the matrix, the iron sulfides were precipitated around Cu from the matrix, whereby bonding between the powder particles was strengthened. In addition,

TABLE 5

| | Mixing ratio mass % | | | | Sintering | Overall composition mass % | | | | | [Mn %] × | [S %] − [Mn %] × |
|---|---|---|---|---|---|---|---|---|---|---|---|---|
| No. | Iron powder | Iron sulfide powder | Copper powder | Graphite powder | temperature ° C. | Fe | Cu | C | Mn | S | 0.6 | 0.6 |
| 21 | Bal. | 5.94 | 0.0 | 1.0 | 1150 | Bal. | 0.0 | 1.0 | 0.28 | 2.17 | 0.2 | 2.0 |
| 22 | Bal. | 5.94 | 0.1 | 1.0 | 1150 | Bal. | 0.1 | 1.0 | 0.28 | 2.17 | 0.2 | 2.0 |
| 23 | Bal. | 5.94 | 0.5 | 1.0 | 1150 | Bal. | 0.5 | 1.0 | 0.28 | 2.17 | 0.2 | 2.0 |
| 24 | Bal. | 5.94 | 1.0 | 1.0 | 1150 | Bal. | 1.0 | 1.0 | 0.28 | 2.17 | 0.2 | 2.0 |
| 08 | Bal. | 5.94 | 1.5 | 1.0 | 1150 | Bal. | 1.5 | 1.0 | 0.27 | 2.16 | 0.2 | 2.0 |
| 25 | Bal. | 5.93 | 2.0 | 1.0 | 1150 | Bal. | 2.0 | 1.0 | 0.27 | 2.16 | 0.2 | 2.0 |
| 26 | Bal. | 5.93 | 2.5 | 1.0 | 1150 | Bal. | 2.5 | 1.0 | 0.27 | 2.16 | 0.2 | 2.0 |
| 27 | Bal. | 5.92 | 5.0 | 1.0 | 1150 | Bal. | 5.0 | 1.0 | 0.26 | 2.16 | 0.2 | 2.0 |
| 28 | Bal. | 5.91 | 7.5 | 1.0 | 1150 | Bal. | 7.5 | 1.0 | 0.26 | 2.15 | 0.2 | 2.0 |
| 29 | Bal. | 5.89 | 10.0 | 1.0 | 1150 | Bal. | 10.0 | 1.0 | 0.25 | 2.15 | 0.1 | 2.0 |
| 30 | Bal. | 5.87 | 15.0 | 1.0 | 1150 | Bal. | 15.0 | 1.0 | 0.23 | 2.14 | 0.1 | 2.0 |

TABLE 6

| No. | Amount of sulfides area % | Ratio of sulfides with sizes of not less than 10 μm % | Amount of martensite phase area % | Frictional coefficient | Compressive strength MPa |
|---|---|---|---|---|---|
| 21 | 11 | 85 | 70 | 0.16 | 390 |
| 22 | 11 | 85 | 72 | 0.14 | 460 |
| 23 | 11 | 85 | 74 | 0.12 | 500 |
| 24 | 10 | 85 | 78 | 0.12 | 520 |
| 08 | 10 | 85 | 80 | 0.10 | 550 |
| 25 | 10 | 85 | 80 | 0.12 | 560 |
| 26 | 10 | 85 | 80 | 0.12 | 560 |
| 27 | 10 | 85 | 78 | 0.10 | 560 |
| 28 | 9 | 85 | 76 | 0.10 | 510 |
| 29 | 9 | 85 | 75 | 0.10 | 470 |
| 30 | 8 | 85 | 60 | 0.10 | 390 |

As shown in Tables 5 and 6, when the amount of Cu in the overall composition was increased by increasing the amount of the copper powder, the amount of the iron sulfide powder was decreased, whereby the amount of the sulfides was decreased. In addition, a part of the amount of Cu formed sulfides, but the specific weights of the copper sulfides are greater than those of the iron sulfides, whereby the area ratio of the sulfides was decreased. Nevertheless, when the amount of Cu was in the range described in the Third Example, sufficient amount of sulfides were obtained, and frictional coefficients were low.

According to the increase of the amount of the copper powder, the compressive strength was greatly increased. In the sample of the sample No. 21, the frictional coefficient was 0.16 and was low, but the compressive strength was lower than 400 MPa. According to the observation of the metallic structure of this sample, a great amount of sulfides was precipitated at interfaces between powder particles, which caused a decrease in strength. On the other hand, in the samples of the samples Nos. 22 to 29, the sulfides were dispersed in the matrix. In these samples, since Cu tends to precipitate separately in the matrix, the iron sulfides were precipitated around Cu from the matrix, whereby bonding between the powder particles was strengthened. In addition, according to the increase of the copper powder, the area ratio of the martensite was increased because Cu improved the hardenability of the steel.

When the amount of Cu was greater than 5 mass %, a free copper phase was increased, whereby the amount of the iron-based matrix containing the martensite structure was decreased, and the compressive strength was decreased. Therefore, when the present invention is applied to a sliding member that must have high strength, the amount of Cu is preferably set to be not more than 10 mass %.

Fourth Example

An iron powder containing 0.3 mass % of Mn, an iron sulfide powder containing 36.47 mass % of S, a copper powder, and a graphite powder, were prepared. Then, 1.5 mass % of the copper powder, the graphite powder in the amounts shown in Table 7 were added to the iron powder. Moreover, the iron sulfide powder was added to the iron powder so that the value of "[S %]−0.6×[Mn %]" would be 2.0, whereby a raw powder was obtained. The raw powder was compacted, sintered, and heat treated in the same manner as in the First Example, whereby samples of samples Nos. 31 to 41 were formed. As in the case of the First Example, the area of the sulfides, the ratio of the sulfides with maximum particle sizes of not less than 10 μm to the total area of the sulfides, the area ratio of the martensite structure, the frictional coefficient, and the compressive strength, were measured. These results are shown in Table 8. The values of the sample of the sample No. 08 in the First Example are also shown in Tables 7 and 8.

TABLE 7

| | Mixing ratio mass % | | | | Sintering temperature | Overall composition mass % | | | | | [Mn %] × | [S %] − [Mn %] × |
|---|---|---|---|---|---|---|---|---|---|---|---|---|
| No. | Iron powder | Iron sulfide powder | Copper powder | Graphite powder | ° C. | Fe | Cu | C | Mn | S | 0.6 | 0.6 |
| 31 | Bal. | 5.94 | 1.5 | 0.0 | 1150 | Bal. | 1.5 | 0.0 | 0.28 | 2.17 | 0.2 | 2.0 |
| 32 | Bal. | 5.94 | 1.5 | 0.2 | 1150 | Bal. | 1.5 | 0.2 | 0.28 | 2.17 | 0.2 | 2.0 |
| 33 | Bal. | 5.94 | 1.5 | 0.4 | 1150 | Bal. | 1.5 | 0.4 | 0.28 | 2.17 | 0.2 | 2.0 |
| 34 | Bal. | 5.94 | 1.5 | 0.6 | 1150 | Bal. | 1.5 | 0.6 | 0.28 | 2.17 | 0.2 | 2.0 |
| 35 | Bal. | 5.94 | 1.5 | 0.8 | 1150 | Bal. | 1.5 | 0.8 | 0.28 | 2.17 | 0.2 | 2.0 |
| 08 | Bal. | 5.94 | 1.5 | 1.0 | 1150 | Bal. | 1.5 | 1.0 | 0.27 | 2.16 | 0.2 | 2.0 |
| 36 | Bal. | 5.93 | 1.5 | 1.2 | 1150 | Bal. | 1.5 | 1.2 | 0.27 | 2.16 | 0.2 | 2.0 |
| 37 | Bal. | 5.93 | 1.5 | 1.4 | 1150 | Bal. | 1.5 | 1.4 | 0.27 | 2.16 | 0.2 | 2.0 |
| 38 | Bal. | 5.93 | 1.5 | 1.6 | 1150 | Bal. | 1.5 | 1.6 | 0.27 | 2.16 | 0.2 | 2.0 |
| 39 | Bal. | 5.93 | 1.5 | 1.8 | 1150 | Bal. | 1.5 | 1.8 | 0.27 | 2.16 | 0.2 | 2.0 |
| 40 | Bal. | 5.93 | 1.5 | 2.0 | 1150 | Bal. | 1.5 | 2.0 | 0.27 | 2.16 | 0.2 | 2.0 |
| 41 | Bal. | 5.93 | 1.5 | 2.2 | 1150 | Bal. | 1.5 | 2.2 | 0.27 | 2.16 | 0.2 | 2.0 |

TABLE 8

| No. | Amount of sulfides area % | Ratio of sulfides with sizes of not less than 10 μm % | Amount of martensite phase area % | Frictional coefficient | Compressive strength MPa |
|---|---|---|---|---|---|
| 31 | 11 | 88 | 0 | 0.22 | 350 |
| 32 | 11 | 88 | 60 | 0.18 | 480 |
| 33 | 10 | 86 | 70 | 0.16 | 500 |
| 34 | 10 | 86 | 75 | 0.14 | 530 |
| 35 | 10 | 85 | 80 | 0.12 | 540 |
| 08 | 10 | 85 | 80 | 0.10 | 550 |
| 36 | 10 | 85 | 78 | 0.12 | 560 |
| 37 | 10 | 85 | 75 | 0.12 | 520 |
| 38 | 10 | 85 | 70 | 0.14 | 500 |
| 39 | 10 | 85 | 65 | 0.16 | 450 |
| 40 | 9 | 84 | 62 | 0.18 | 400 |
| 41 | 9 | 84 | 60 | 0.22 | — |

As shown in Tables 7 and 8, when the amount of C in the overall composition was increased by increasing the amount of the graphite powder, the amount of the iron sulfide powder was decreased. Therefore, the amount of the sulfides was slightly decreased, but the sizes of the sulfides were not greatly changed. In this case, the area ratio of the martensite was changed. In the sample of the sample No. 31, C was not contained, whereby the martensite structure was not obtained, and the hardness was decreased. As a result, the sample of the sample No. 31 was worn away, and the frictional coefficient was high. In addition, the compressive strength was low. On the other hand, when the amount of C was not less than 0.2 mass % in the overall composition, not less than 60% of the martensite structure was obtained, whereby the frictional coefficient was decreased, and the compressive strength was increased. By forming not less than 50% of the matrix so as to be made of the martensite structure, the wear resistance was improved, and the samples were not easily worn even under high surface pressure.

On the other hand, when the amount of C was greater than 1.0 mass % in the overall composition, the area ratio of the martensite was decreased. In this regard, the frictional coefficient was increased, and the compressive strength was decreased, because cementite started to precipitate and residual austenite tended to be generated according to the increase in the amount of C. The cementite is hard and thereby wore the mating material, whereby the frictional coefficient was increased. When the amount of the graphite powder was greater than 2.0 mass %, a great amount of cementite was generated and decreased the melting point, whereby the liquid phase was excessively generated. As a result, the sample of the sample No. 41 lost its shape. Accordingly, the amount of C is set to be not less than 0.2 mass % and not more than 2 mass %.

Fifth Example

An iron powder containing 0.3 mass % of Mn, an iron sulfide powder containing 36.47 mass % of S, a copper powder, and a graphite powder, were prepared. Then, 1.5 mass % of the copper powder and 1.0 mass % of the graphite powder were added to the iron powder. Moreover, the iron sulfide powder was added to the iron powder so that the value of "[S %]−0.6×[Mn %]" would be 2.0, whereby a raw powder was obtained. The raw powder was compacted, sintered, and heat treated in the same manner as in the First Example, whereby samples of samples Nos. 42 to 46 were formed. In this case, the sintering was performed at the sintering temperature shown in Table 9. As in the case of the First Example, the area of the sulfides, the ratio of the sulfides with maximum particle sizes of not less than 10 μm to the total area of the sulfides, the area ratio of the martensite structure, the frictional coefficient, and the compressive strength, were measured. These results are shown in Table 9. The values of the sample of the sample No. 08 in the First Example are also shown in Table 9.

TABLE 9

| No. | Sintering temperature ° C. | [Mn %] × 0.6 | [S %] − [Mn %] × 0.6 | Amount of sulfides area % | Ratio of sulfides with sizes of not less than 10 μm % | Amount of martensite phase area % | Frictional coefficient | Compressive strength MPa |
|---|---|---|---|---|---|---|---|---|
| 42 | 950 | 0.2 | 2.0 | 10 | 50 | 80 | 0.20 | 350 |
| 43 | 1000 | 0.2 | 2.0 | 10 | 65 | 80 | 0.18 | 420 |
| 44 | 1100 | 0.2 | 2.0 | 10 | 80 | 80 | 0.13 | 530 |

TABLE 9-continued

| No. | Sintering temperature ° C. | [Mn %] × 0.6 | [S %] − [Mn %] × 0.6 | Amount of sulfides area % | Ratio of sulfides with sizes of not less than 10 μm % | Amount of martensite phase area % | Frictional coefficient | Compressive strength MPa |
|---|---|---|---|---|---|---|---|---|
| 08 | 1150 | 0.2 | 2.0 | 10 | 85 | 80 | 0.10 | 550 |
| 45 | 1200 | 0.2 | 2.0 | 10 | 90 | 80 | 0.11 | 560 |
| 46 | 1250 | 0.2 | 2.0 | — | — | — | — | — |

As shown in Table 9, the ratio of the sulfides with sizes of not less than 10 μm was increased with the increase of the sintering temperature. In this regard, the frictional coefficient was correspondingly decreased. In this case, when the sintering temperature was less than 1000° C., sulfides with sufficient sizes were not obtained, whereby the frictional coefficient was high. In addition, sintering was not sufficiently performed, whereby sufficient compressive strength was not obtained. On the other hand, when the sintering temperature was 1250° C., the liquid phase was excessively generated, whereby the shape of the sample of the sample No. 46 could not be maintained and was damaged. Accordingly, the sintering temperature must be set at a temperature in the range of 1000 to 1200° C.

Sixth Example

An iron powder containing 0.3 mass % of Mn, an iron sulfide powder containing 36.47 mass % of S, a copper powder, a graphite powder, and a nickel powder, were prepared. Then, 1.5 mass % of the copper powder, 1.0 mass % of the graphite powder, and the nickel powder in the amounts shown in Table 10, were added to the iron powder. Moreover, the iron sulfide powder was added to the iron powder so that the value of "[S %]−0.6×[Mn %]" would be 2.0, whereby a raw powder was obtained. The raw powder was compacted, sintered, and heat treated in the same manner as in the First Example, whereby samples of samples Nos. 47 to 51 were formed. As in the case of the First Example, the area of the sulfides, the ratio of the sulfides with maximum particle sizes of not less than 10 μm to the total area of the sulfides, the area ratio of the martensite structure, the frictional coefficient, and the compressive strength, were measured. These results are shown in Table 11. The values of the sample of the sample No. 08 in the First Example are also shown in Tables 10 and 11.

TABLE 11

| No. | Amount of sulfides area % | Ratio of sulfides with sizes of not less than 10 μm % | Amount of martensite phase area % | Frictional coefficient | Compressive strength MPa |
|---|---|---|---|---|---|
| 08 | 10 | 85 | 80 | 0.10 | 550 |
| 47 | 10 | 85 | 84 | 0.12 | 560 |
| 48 | 10 | 85 | 86 | 0.11 | 580 |
| 49 | 10 | 85 | 82 | 0.10 | 580 |
| 50 | 9 | 85 | 75 | 0.12 | 540 |
| 51 | 9 | 85 | 70 | 0.22 | 490 |

As shown in Tables 10 and 11, by increasing the amount of the nickel powder, the area ratio of the martensite was increased because Ni improved the hardenability. Therefore, the compressive strength was increased. On the other hand, when the amount of the nickel powder was greater than 3.0 mass %, a soft nickel-rich phase was increased, whereby the area ratio of the martensite was decreased, and the compressive strength was decreased. Moreover, when the amount of the nickel powder was greater than 10 mass %, a great amount of the soft nickel-rich phase was generated, whereby wear proceeded from the nickel-rich phase, and the frictional coefficient was increased. Accordingly, the amount of Ni is preferably not more than 10 mass % in the overall composition.

Seventh Example

An iron powder containing 0.3 mass % of Mn, a molybdenum disulfide powder containing 40.06 mass % of S, a copper sulfide powder containing 33.54 mass % of S, a copper powder, and a graphite powder, were prepared. Then, one of the molybdenum disulfide powder and the copper sulfide powder was added to the iron powder so that the

TABLE 10

| | Mixing ratio mass % | | | | | Sintering temperature ° C. | Overall composition mass % | | | | | | [Mn %] × 0.6 | [S %] − [Mn %] × 0.6 |
|---|---|---|---|---|---|---|---|---|---|---|---|---|---|---|
| No. | Iron powder | Iron sulfide powder | Copper powder | Nickel powder | Graphite powder | | Fe | Cu | Ni | C | Mn | S | | |
| 08 | Bal. | 5.94 | 1.5 | 0.0 | 1.0 | 1150 | Bal. | 1.5 | 0.0 | 1.0 | 0.27 | 2.2 | 0.2 | 2.0 |
| 47 | Bal. | 5.93 | 1.5 | 1.0 | 1.0 | 1150 | Bal. | 1.5 | 1.0 | 1.0 | 0.27 | 2.2 | 0.2 | 2.0 |
| 48 | Bal. | 5.92 | 1.5 | 3.0 | 1.0 | 1150 | Bal. | 1.5 | 3.0 | 1.0 | 0.27 | 2.2 | 0.2 | 2.0 |
| 49 | Bal. | 5.91 | 1.5 | 5.0 | 1.0 | 1150 | Bal. | 1.5 | 5.0 | 1.0 | 0.26 | 2.2 | 0.2 | 2.0 |
| 50 | Bal. | 5.89 | 1.5 | 10.0 | 1.0 | 1150 | Bal. | 1.5 | 10.0 | 1.0 | 0.24 | 2.1 | 0.1 | 2.0 |
| 51 | Bal. | 5.86 | 1.5 | 15.0 | 1.0 | 1150 | Bal. | 1.5 | 15.0 | 1.0 | 0.23 | 2.1 | 0.1 | 2.0 | value of "[S %]−0.6×[Mn %]" would be 2.0. Moreover, 1.5 mass % of the copper powder and 1.0 mass % of the graphite powder were also added to the iron powder, whereby a raw powder was obtained. The raw powder was compacted, sintered, and heat treated in the same manner as in the First Example, whereby samples of samples Nos. 52 and 53 were formed. As in the case of the First Example, the area of the sulfides, the ratio of the sulfides with maximum particle sizes of not less than 10 μm to the total area of the sulfides, the area ratio of the martensite structure, the frictional coefficient, and the compressive strength, were measured. These results are shown in Table 13. The values of the sample of the sample No. 08 in the First Example are also shown in Tables 12 and 13.

amount of S was not greatly changed. Since the molybdenum disulfide powder and the copper sulfide powder include Mo and Cu, respectively, which improve the hardenability, the strength of the matrix was improved, and the compressive strength was high.

Eighth Example

An iron alloy powder containing Mn at 0.3 mass % and Mo in the amounts shown in Table 14, an iron sulfide powder containing 36.47 mass % of S, a copper powder, and a graphite powder, were prepared. Then, 1.5 mass % of the

TABLE 12

| | Mixing ratio mass % | | | | Sintering | Overall composition | | | | | | [S %] − | |
|---|---|---|---|---|---|---|---|---|---|---|---|---|---|
| | Iron | Sulfide | Copper | Graphite | temperature | | | mass % | | | | [Mn %] × | [Mn %] × |
| No. | powder | powder | powder | powder | ° C. | Fe | Cu | Mo | C | Mn | S | 0.6 | 0.6 |
| 08 | Bal. | Iron sulfide powder 5.94 | 1.5 | 1.0 | 1150 | Bal. | 1.5 | — | 1.0 | 0.27 | 2.16 | 0.16 | 2.00 |
| 52 | Bal. | Molybdenum disulfide powder 5.41 | 1.5 | 1.0 | 1150 | Bal. | 1.5 | 3.24 | 1.0 | 0.28 | 2.17 | 0.17 | 2.00 |
| 53 | Bal. | Copper sulfide powder 6.45 | 1.5 | 1.0 | 1150 | Bal. | 5.8 | — | 1.0 | 0.27 | 2.16 | 0.16 | 2.00 |

TABLE 13

| No. | Amount of sulfides area % | Ratio of sulfides with sizes of not less than 10 μm % | Amount of martensite phase area % | Frictional coefficient | Compressive strength MPa |
|---|---|---|---|---|---|
| 08 | 10 | 85 | 80 | 0.10 | 550 |
| 52 | 10 | 84 | 85 | 0.11 | 580 |
| 53 | 11 | 85 | 83 | 0.12 | 560 |

As shown in Tables 12 and 13, even when the kind of the metallic sulfides was changed, the sizes and the amount of the sulfides were not greatly changed, and the frictional coefficient was approximately constant, as long as the copper powder and 1.0 mass % of the graphite powder were added to the iron alloy powder. Moreover, the iron sulfide powder was added to the iron powder so that the value of "[S %]−0.6×[Mn %]" would be 2.0, whereby a raw powder was obtained. The raw powder was compacted, sintered, and heat treated in the same manner as in the First Example, whereby samples of samples Nos. 54 to 58 were formed. As in the case of the First Example, the area of the sulfides, the ratio of the sulfides with maximum particle sizes of not less than 10 μm to the total area of the sulfides, the area ratio of the martensite structure, the frictional coefficient, and the compressive strength, were measured. These results are shown in Table 15. The values of the sample of the sample No. 08 in the First Example are also shown in Tables 14 and 15.

TABLE 14

| | Mixing ratio mass % | | | | | | Sintering | Overall composition | | | | | | [S %] − | |
|---|---|---|---|---|---|---|---|---|---|---|---|---|---|---|---|
| | Iron alloy powder | | Iron sulfide powder | | | | | | | mass % | | | | | |
| | Mo | Mn | | S | Copper | Graphite | temperature | | | | | | | [Mn %] × | [Mn %] × |
| No. | mass % | mass % | | mass % | powder | powder | ° C. | Fe | Mo | Cu | C | Mn | S | 0.6 | 0.6 |
| 08 | Bal. | 0.0 | 0.30 | 5.94 | 36.47 | 1.5 | 1.0 | 1150 | Bal. | 0.0 | 1.5 | 1.0 | 0.27 | 2.16 | 0.16 | 2.00 |
| 54 | Bal. | 1.0 | 0.30 | 5.94 | 36.47 | 1.5 | 1.0 | 1150 | Bal. | 0.9 | 1.5 | 1.0 | 0.27 | 2.16 | 0.16 | 2.00 |
| 55 | Bal. | 3.0 | 0.30 | 5.94 | 36.47 | 1.5 | 1.0 | 1150 | Bal. | 2.7 | 1.5 | 1.0 | 0.27 | 2.16 | 0.16 | 2.00 |
| 56 | Bal. | 5.0 | 0.30 | 5.94 | 36.47 | 1.5 | 1.0 | 1150 | Bal. | 4.6 | 1.5 | 1.0 | 0.27 | 2.16 | 0.16 | 2.00 |
| 57 | Bal. | 10.0 | 0.30 | 5.94 | 36.47 | 1.5 | 1.0 | 1150 | Bal. | 9.2 | 1.5 | 1.0 | 0.27 | 2.16 | 0.16 | 2.00 |
| 58 | Bal. | 15.0 | 0.30 | 5.94 | 36.47 | 1.5 | 1.0 | 1150 | Bal. | 13.7 | 1.5 | 1.0 | 0.27 | 2.16 | 0.16 | 2.00 |

TABLE 15

| No. | Amount of sulfides area % | Ratio of sulfides with sizes of not less than 10 μm % | Amount of martensite phase area % | Frictional coefficient | Compressive strength MPa |
|---|---|---|---|---|---|
| 08 | 10 | 85 | 80 | 0.10 | 550 |
| 54 | 10 | 85 | 86 | 0.11 | 570 |
| 55 | 10 | 85 | 88 | 0.11 | 590 |
| 56 | 10 | 85 | 88 | 0.10 | 600 |
| 57 | 10 | 85 | 88 | 0.11 | 610 |
| 58 | 10 | 85 | 88 | 0.11 | 610 |

As shown in Tables 14 and 15, according to the increase of the amount of Mo in the iron alloy powder, the area ratio of the martensite was increased because Mo improved the hardenability. Therefore, the compressive strength was also improved. According to the sample of the sample No. 58, the compressive strength was not further improved even by adding Mo at greater than 10 mass %. In addition, Mo is an expensive alloy element. Accordingly, the amount of Mo is preferably not more than 10 mass % in the overall composition.

What is claimed is:

1. An iron-based sintered sliding member comprising a composition consisting of:
   0.1 to 10 mass % of Cu,
   0.2 to 2.0 mass % of C,
   0.03 to 0.9 mass % of Mn,
   0.52 to 6.54 mass % of S,
   optionally at least one of not more than 10 mass % of Ni and not more than 10 mass % of Mo, and
   a balance of Fe and inevitable impurities,
   wherein:
   the iron-based sintered sliding member satisfies a First Formula:

[S %]=0.6×[Mn %]+0.5 to 6.0 where [S %] represents a mass % of S and [Mn %] represents a mass % of Mn based on a total mass % of the composition,
   the iron-based sintered sliding member exhibits a metallic structure in which pores and sulfide particles are dispersed in a matrix that contains a martensite structure at not less than 60% by area ratio in a cross section, the sulfide particles being dispersed at 3 to 30 vol. % with respect to the matrix; and
   a majority of the sulfide particles in volume percent is iron sulfide that precipitated in the matrix.

2. The iron-based sintered sliding member according to claim 1, wherein 60% or more of the sulfide particles have maximum particle sizes of 10 μm or more.

3. The iron-based sintered sliding member according to claim 1, wherein the iron-based sintered sliding member is usable in a sliding condition in which not less than 20 MPa of surface pressure is applied.

4. The iron-based sintered sliding member according to claim 1, wherein [S %]−0.06×[Mn %]=1.0 to 6.0.

5. The iron-based sintered sliding member according to claim 1, wherein S is added in a form of at least one metallic sulfide powder selected from the group consisting of an iron sulfide powder and a copper sulfide powder.

6. A production method for the iron-based sintered sliding member according to claim 1, the method comprising:
   preparing an iron powder, a copper powder, a graphite powder, and at least one sulfide powder of an iron sulfide powder and a copper sulfide powder, the iron powder consisting of 0.03 to 1.0 mass % of Mn and the balance of Fe and inevitable impurities;
   forming a raw powder by mixing the copper powder, the graphite powder, and the sulfide powder with the iron powder so as to consist of, by mass %, 0.1 to 10% of Cu, 0.2 to 2.0% of C, 0.03 to 0.9% of Mn, 0.52 to 6.54% of S, and the balance of Fe and inevitable impurities;
   compacting the raw powder into a green compact with a predetermined shape;
   sintering the green compact at a temperature of 1000 to 1200° C.; and
   quench hardening and tempering the sintered compact.

7. The production method for the iron-based sintered sliding member according to claim 6, wherein at least one of a nickel sulfide powder and a molybdenum disulfide powder is added to the raw powder in addition to the sulfide powder, or instead of a part of an amount or the entirety of the sulfide powder, so that the raw powder further includes at least one of not more than 10 mass % of Ni and not more than 10 mass % of Mo.

8. The production method for the iron-based sintered sliding member according to claim 6, wherein Mo is added in the form of an iron alloy powder by adding Mo to the iron powder, or Mo is added to the raw powder in the form of a molybdenum powder in addition to or instead of the iron alloy powder, so that the raw powder further includes not more than 10 mass % of Mo.

9. The production method for the iron-based sintered sliding member according to claim 6, wherein Ni is added in the form of an iron alloy powder by adding Ni to the iron powder, or Ni is added to the raw powder in the form of a nickel powder in addition to or instead of the iron alloy powder, so that the raw powder further includes not more than 10 mass % of Ni.

* * * * *